United States Patent [19]

Butler

[11] Patent Number: 5,571,247
[45] Date of Patent: Nov. 5, 1996

[54] SELF CONTAINING ENCLOSURE FOR PROTECTION FROM KILLER BEES

[76] Inventor: Virginia L. Butler, P.O. Box 1134, Redlands, Calif. 92373

[21] Appl. No.: 556,406

[22] Filed: Nov. 13, 1995

[51] Int. Cl.⁶ .......................... A01K 55/00; E04H 15/00
[52] U.S. Cl. .................... 135/87; 135/902; 135/904; 135/115
[58] Field of Search .................... 135/900–902, 135/904, 90, 115, 87, 143, 117; 43/1; 2/2, 4

[56] References Cited

U.S. PATENT DOCUMENTS

| 1,288,518 | 12/1918 | Collier | 135/904 X |
|---|---|---|---|
| 1,581,180 | 4/1926 | Csajaghy et al. | 135/90 X |
| 1,804,190 | 5/1931 | Wendel | 135/902 X |
| 2,106,664 | 1/1938 | Shoglow | 135/902 X |
| 3,288,157 | 11/1966 | Szkolny | 135/902 X |
| 3,498,305 | 3/1970 | Hulin | 135/90 |
| 3,880,459 | 4/1975 | Kelley | 135/117 X |
| 4,224,754 | 9/1980 | Derryberry | 135/117 X |
| 4,265,615 | 5/1981 | Barker | 135/117 X |
| 4,825,578 | 5/1989 | Robinson | 135/90 X |
| 5,096,214 | 3/1992 | Walker et al. | 135/115 X |

FOREIGN PATENT DOCUMENTS

| 1258985 | 3/1961 | France | 135/902 |
|---|---|---|---|
| 0274284 | 7/1927 | United Kingdom | 135/902 |

*Primary Examiner*—Lanna Mai

[57] ABSTRACT

A self containing enclosure for protection from killer bees comprising an enclosure formed of a flexible transparent plastic material selected from the class of plastic materials. The enclosure is positionable about a vertically extending axis and has an oval cross sectional configuration. A circular aperture is formed in the upper half of the enclosure. A mesh is positioned in the aperture for allowing a user inside the enclosure to see therethrough and to breath therethrough. An opening is formed in the enclosure along a vertical extent thereof. The opening is provided with pile type fasteners adjacent to the opposite edges for overlapping and coupling therewith allowing a user to enter and exit.

1 Claim, 3 Drawing Sheets

1

SELF CONTAINING ENCLOSURE FOR PROTECTION FROM KILLER BEES

BACKGROUND OF THE INVENTION

1. Field of the Invention

The present invention relates to self containing enclosure for protection from killer bees and more particularly pertains to protecting a person from an oncoming swarm of bees through a self contained enclosure with an opening for entry and egress and a screen for ventilation and viewing.

2. Description of the Prior Art

The use of various items of apparel for shielding one from bees is known in the prior art. More specifically, various items of apparel for shielding one from bees heretofore devised and utilized for the purpose of protecting people from bees through protective clothing and devices of various designs are known to consists basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,214,797 to Tisdale a method and apparatus for protection of skin against mosquitos and other insects.

U.S. Pat. No. 5,091,993 to Merrill et al. discloses an insect protective garment.

U.S. Pat. No. 4,985,933 to Lemoine discloses a ventilated beekeeper suit.

U.S. Pat. No. 4,716,594 to Shannon discloses a protective garment for protection against mosquitoes and other insects.

U.S. Pat. No. 3,582,989 to Fassbender discloses a beekeeper's protective clothing.

In this respect, the self containing enclosure for protection from killer bees according to the present invention substantially departs from the conventional concepts and designs of the prior art, and in doing so provides an apparatus primarily developed for the purpose of protecting a person from an oncoming swarm of bees through a self contained enclosure with an opening for entry and egress and a screen for ventilation and viewing.

Therefore, it can be appreciated that there exists a continuing need for new and improved self containing enclosure for protection from killer bees which can be used for protecting a person from an oncoming swarm of bees through a self contained enclosure with an opening for entry and egress and a screen for ventilation and viewing. In this regard, the present invention substantially fulfills this need.

SUMMARY OF THE INVENTION

In view of the foregoing disadvantages inherent in the known types of various items of apparel for shielding one from bees now present in the prior art, the present invention provides an improved self containing enclosure for protection from killer bees. As such, the general purpose of the present invention, which will be described subsequently in greater detail, is to provide a new and improved self containing enclosure for protection from killer bees and method which has all the advantages of the prior art and none of the disadvantages.

To attain this, the present invention essentially comprises a new and improved self containing enclosure for protection from killer bees comprising, in combination, an enclosure formed of a flexible transparent plastic material selected from the class of plastic materials including polyethylene, nylon and the like. The enclosure is positionable about a vertically extending axis and having an oval cross sectional configuration. The height of the enclosure is about 6 feet and the intermediate cross-sectional circumference is about 3 feet. A circular aperture is formed in the upper half of the enclosure. A mesh is positioned in the aperture for allowing a user inside the enclosure to see therethrough and to breath therethrough. An opening is formed in the enclosure along a vertical extent thereof offset from the mesh by a distance less than the diameter of the aperture. The opening is provided with pile type fasteners adjacent to the opposite edges for overlapping and coupling therewith. An air-tight seam couples the mesh to the enclosure. Such seam is formed by doubling back the mesh with stitching therearound. A pouch is formed with a main extent for the receipt of the enclosure and lid therein when not in use. The pouch has a flap with a releasable fastener on the main extent and the flap for the coupling thereof.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved self containing enclosure for protection from killer bees which have all the advantages of the prior art various items of apparel for shielding one from bees and none of the disadvantages.

It is another object of the present invention to provide a new and improved self containing enclosure for protection from killer bees which may be easily and efficiently manufactured and marketed.

It is further object of the present invention to provide a new and improved self containing enclosure for protection from killer bees which are of durable and reliable constructions.

An even further object of the present invention is to provide a new and improved self containing enclosure for protection from killer bees which are susceptible of a low cost of manufacture with regard to both materials and labor, and which accordingly are then susceptible of low prices of sale to the consuming public, thereby making such self containing enclosure for protection from killer bees economically available to the buying public.

Still yet another object of the present invention is to provide a new and improved self containing enclosure for protection from killer bees which provide in the apparatuses and methods of the prior art some of the advantages thereof, while simultaneously overcoming some of the disadvantages normally associated therewith.

Still another object of the present invention is to protecting a person from an oncoming swarm of bees through a self contained enclosure with an opening for entry and egress and a screen for ventilation and viewing.

Lastly, it is an object of the present invention to provide new and improved self containing enclosure for protection from killer bees comprising an enclosure formed of a flexible transparent plastic material selected from the class of plastic materials. The enclosure is positionable about a vertically extending axis and has an oval cross-sectional configuration. A circular aperture is formed in the upper half of the enclosure. A mesh is positioned in the aperture for allowing a user inside the enclosure to see therethrough and to breath therethrough. An opening is formed in the enclosure along a vertical extent thereof. The opening is provided with pile type fasteners adjacent to the opposite edges for overlapping and coupling therewith allowing a user to enter and exit.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
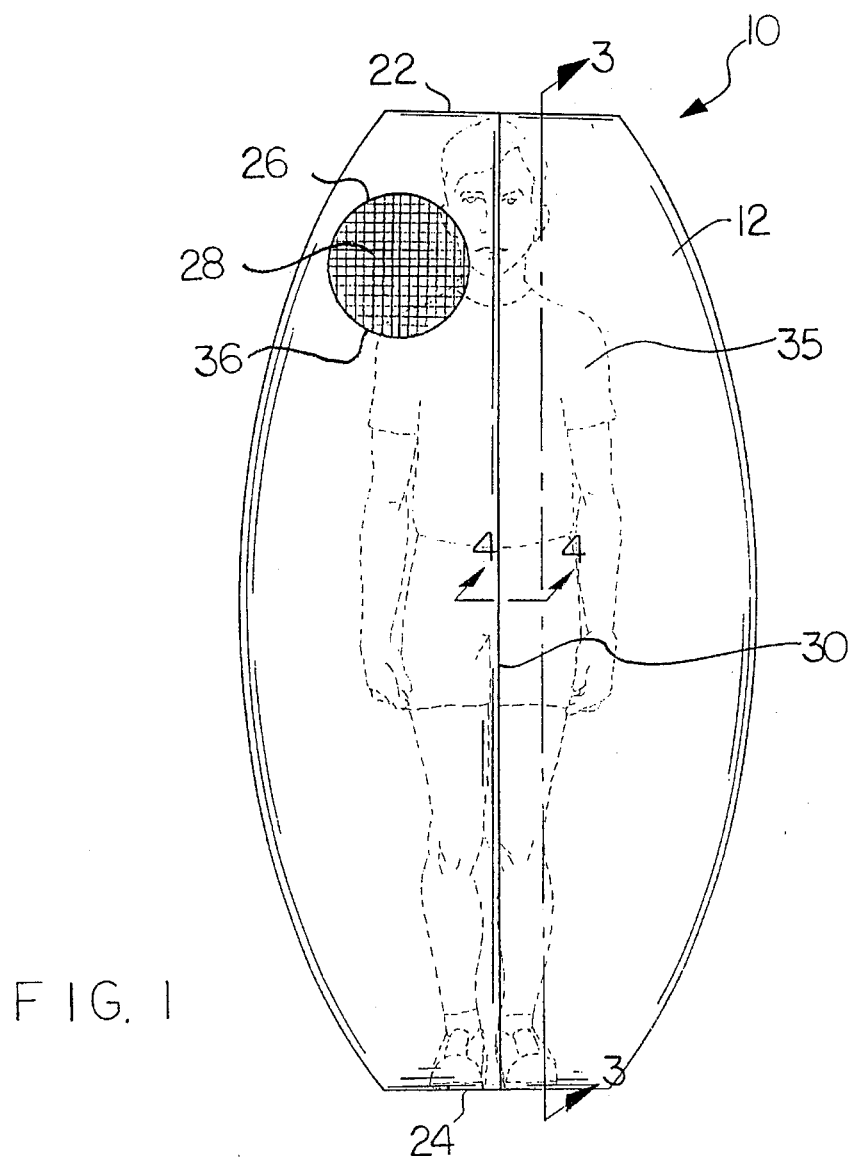
FIG. 1 is a plan view of the preferred embodiment of the self containing enclosure for protection from killer bees constructed in accordance with the principles of the present invention.
Figure 2:
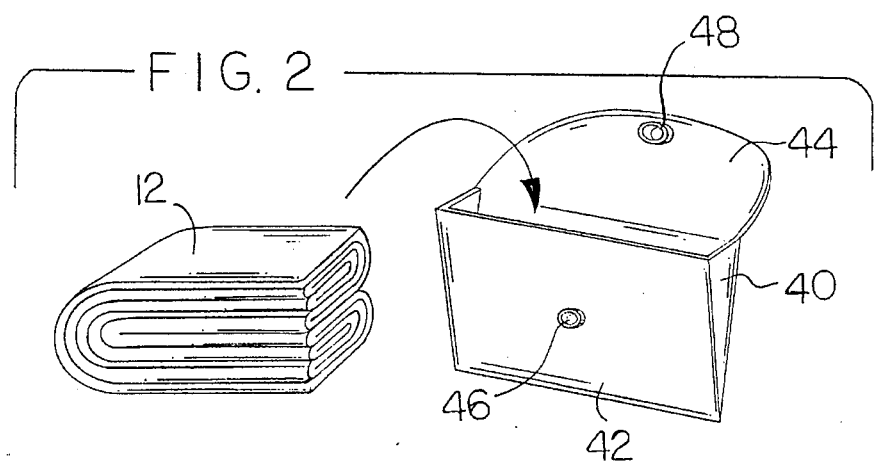
FIG. 2 is a perspective view of the device in an unemployed orientation.
Figure 3:
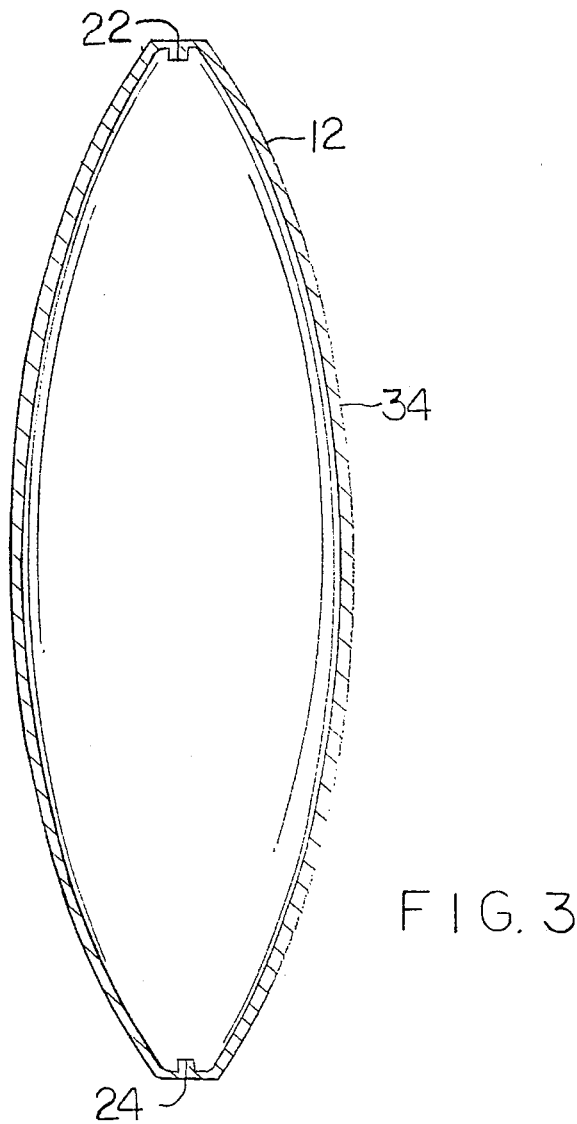
FIG. 3 is a cross-sectional top plan view taken along Line 3—3 shown in FIGS. 1.
Figure 4:
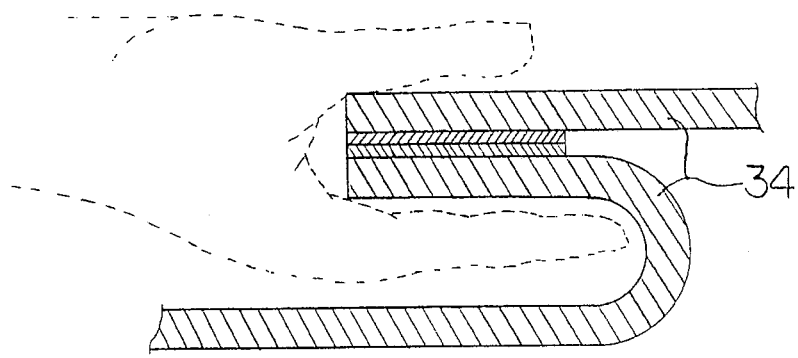
FIG. 4 is an enlarged illustration of the pile type fasteners.
Figure 5:
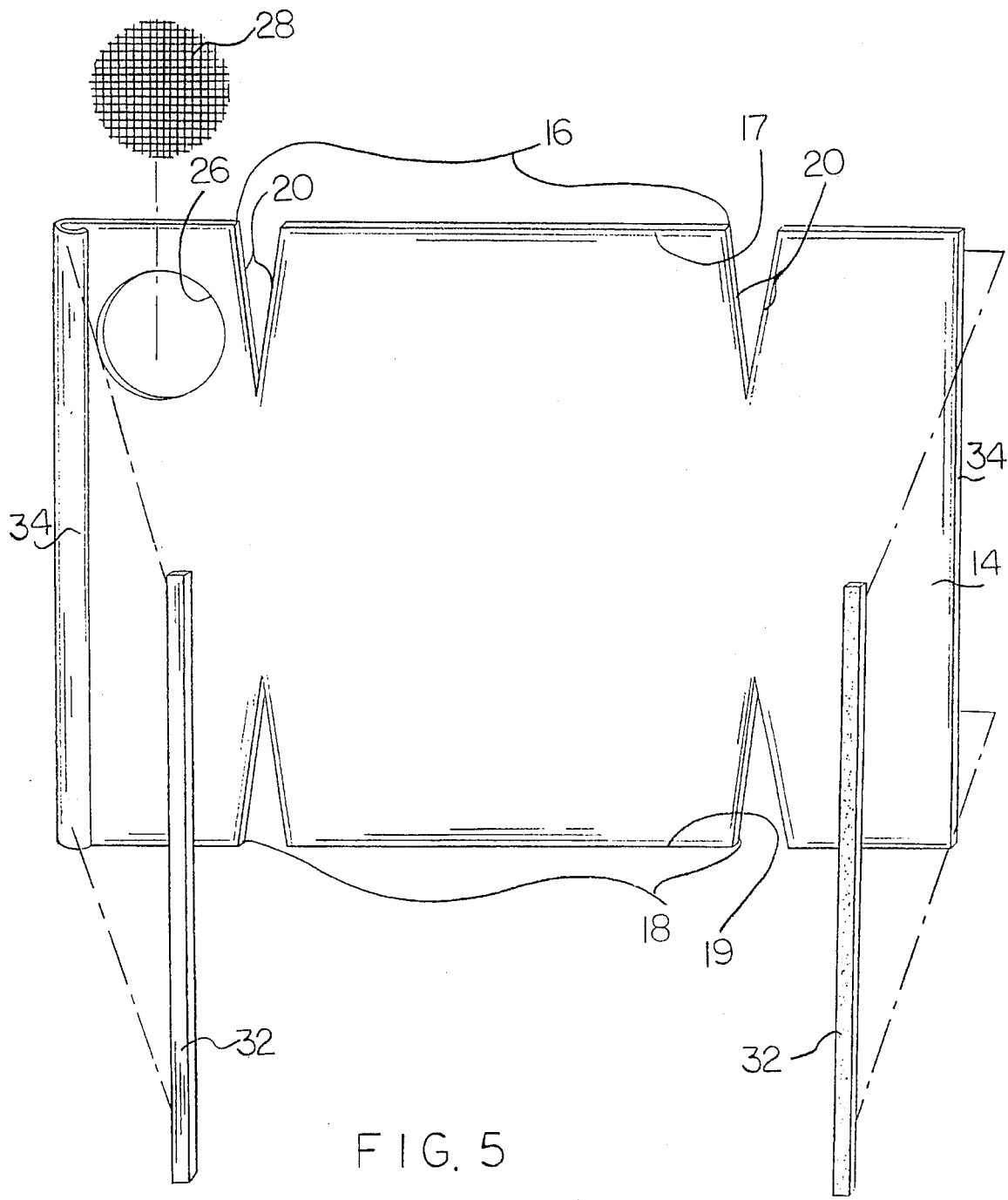
FIG. 5 is a plan view of the present invention unassembled.

With reference now to the drawings, and in particular to FIG. 1 thereof, the preferred embodiment of the new and improved self containing enclosure for protection from killer bees embodying the principles and concepts of the present invention and generally designated by the reference numeral 10 will be described.

The present invention, the new and improved self containing enclosure for protection from killer bees, is a system 10 comprised of a plurality of component elements. Such elements include, in their broadest context, an enclosure, a circular aperture in the enclosure, an opening in the enclosure, and a pouch. Such components are individually configured and correlated with respect to each other so as to attain the desired objective.

More specifically, the central component of the system 10 is an enclosure 12. The enclosure 12 is constructed to have a generally cylindrical configuration. The enclosure comprises a sheet 14 formed of a flexible transparent plastic material selected from the class of materials including polyethylene and nylon. The sheet has a pair of V-shaped cutouts 16 formed on an upper edge 17 and a pair of V-shaped cutouts 18 formed on a lower edge 19. Each V-shaped cutout has a pair of opposing edges 20 sealed together. The upper edge is sealed to form a closed top 22. The lower edge is sealed to form a closed bottom 24. The enclosure has an intermediate cross-sectional circumference that is larger than the upper and lower cross-sectional circumference.

The enclosure is positionable about a vertically extending axis. It has an oval cross-sectional configuration. The height of the enclosure is about six foot. The intermediate cross-sectional circumference is about ten foot.

Formed into the enclosure is a circular aperture 26. Such aperture is formed in the upper half of the enclosure and has a diameter of about 1 foot.

Secured with the circular aperture is a circular piece of mesh 28. Such mesh is positioned in the aperture for allowing a user inside the enclosure to see therethrough. It also facilitates ventilation and breathing.

Next provided is an elongated linear opening 30 laterally offset from the mesh a distance less than the diameter of the aperture and mesh. The opening is formed in the enclosure along a vertical extent thereof with opposite edges. The opening is provided with pile type fasteners 32 adjacent to the opposite edges for overlapping. Each pile type fastener is situated on an outer surface 34 of the enclosure 12 allowing a user 35 to seal the enclosure from within. In this manner, such edges may overlap for coupling when the enclosure is in an operative position and for uncoupling when in an inoperative position for entering and leaving the enclosure by a user.

An air-tight seam is also provided for coupling the mesh to the enclosure at the edge of the aperture. Such seam is formed by coupling back the mesh material and enclosure material. A circular row of stitching is then formed therearound.

The last component of the system 10 is a pouch 40. The pouch is formed with a main extent 42 for allowing receipt of the enclosure when not in use. The pouch has a flap 44 with a releasable fastener 46, 48 on the main extent as well as on the flap for the coupling thereof with the device stowed therein.

The present invention is designed to protect a person from attack by bees which have now propagated to the United States. The present invention is made of thin, but sting resistant material, such as mylar or plastic, in the form of a large bag enclosure. It stands approximately six feet high and is approximately three feet wide. A vertically oriented opening, which is sealed by a strip of hook and loop material or an elongated zipper, serves as the entry/exit passageway. A round section of very fine mesh screen is located just to the side of the entry flap. This serves to ventilate the interior of the enclosure. When not in use, the present invention can be compactly folded and carried in a lightweight pouch that fits easily into a backpack, purse, picnic basket, or pocket.

In use, one can quickly unfold the present invention when the sound of a swarm is initially heard and enter the protective chamber before the bees actually approach. Even if one or two bees enter the enclosure during the process, the number of stings and proportionate danger will be greatly reduced.

For those who are allergic to bee stings, the commonly used "Epi-pen" or an antihistamine could be permanently carried in the bag and available for use once the person is within the enclosure. The idea is simple but Very effective, and the threat is real; hence, the simple means of carrying the unobtrusive pouch could well serve to save lives, especially of persons who are allergic.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved self containing enclosure for protection from killer bees comprising, in combination:

an enclosure with a generally cylindrical configuration comprising a sheet formed of a flexible transparent plastic material selected from the class of materials including polyethylene and nylon, the sheet having a pair of V-shaped cutouts formed on an upper edge and a pair of V-shaped cutouts formed on a lower edge, each V-shaped cutout having a pair of opposing edges sealed together, the upper edge thereof sealed to form a closed top, the lower edge thereof sealed to form a closed bottom, the enclosure having an intermediate cross-sectional circumference larger than an upper and a lower cross-sectional circumference;

a circular aperture formed adjacent the upper edge of the enclosure;

a mesh positioned in the aperture for allowing a user inside the enclosure to see therethrough and to breath therethrough;

an opening formed in the enclosure along a vertical extent thereof with opposite edges, the opening being provided with pile type fasteners adjacent to the opposite edges for overlapping, each pile type fastener situated on an outer surface of the enclosure allowing a user to seal the enclosure from within; and a pouch formed with a main extent for the receipt of the enclosure therein when not in use, the pouch having a flap with a releasable fastener on the main extent and the flap for the coupling thereof.

\* \* \* \* \*